Patented May 31, 1927.

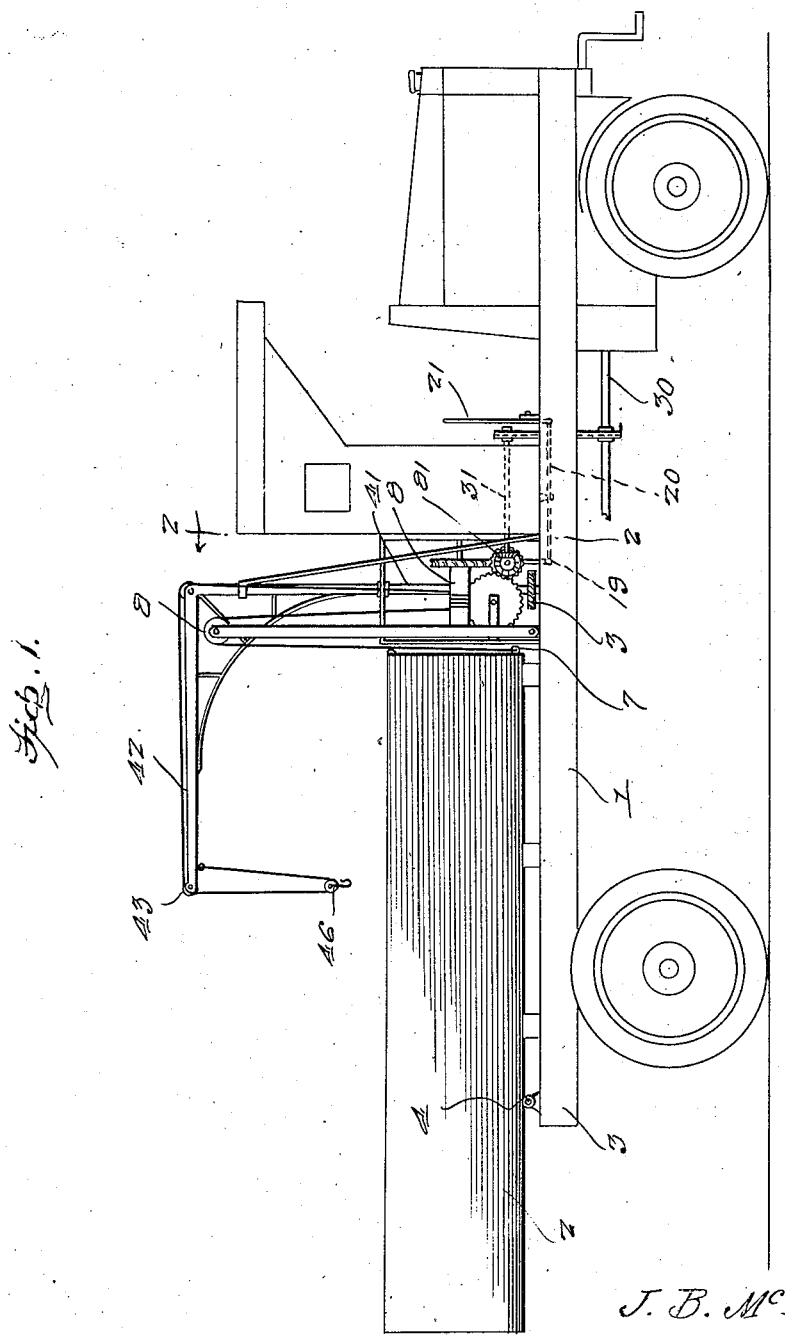

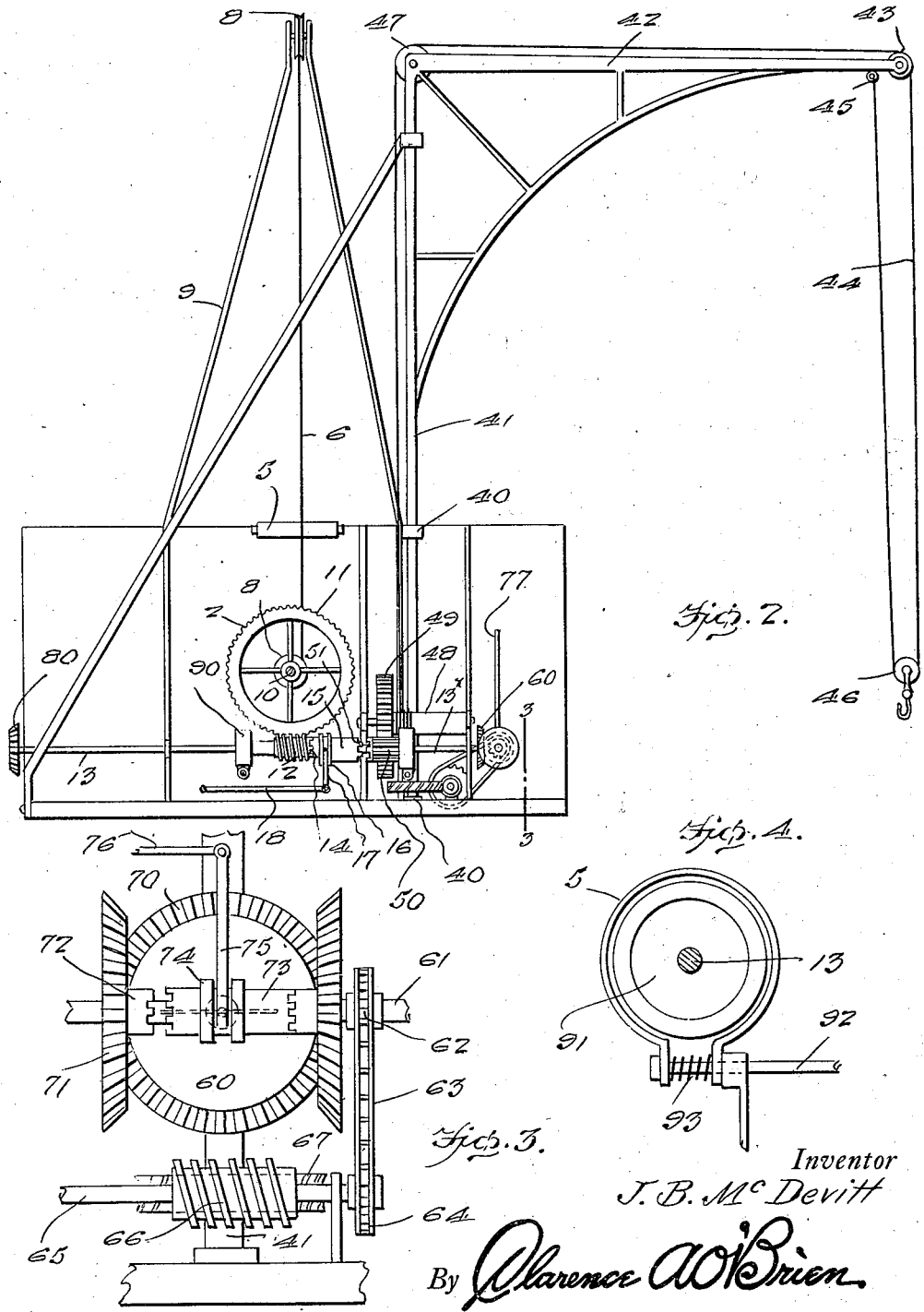

1,630,398

UNITED STATES PATENT OFFICE.

JAMES B. McDEVITT, OF UHRICHSVILLE, OHIO.

FREIGHT-HANDLING EQUIPMENT FOR MOTOR TRUCKS.

Application filed January 21, 1926. Serial No. 82,764.

My present invention has to do with motor trucks, and has for its general object the provision of a simple, easily controlled and efficient equipment, operable by the engine of the truck, and adapted to be used to advantage in handling freight incident to the loading and the unloading of the truck.

To the attainment of the foregoing, the invention consists in the improvement as hereinafter described and definitely claimed.

In the accompanying drawings, forming part of this specification:—

Figure 1 is a side elevation of a motor truck equipped with the preferred embodiment of my invention.

Figure 2 is an enlarged detail cross-section taken in the plane indicated by the line 2—2 of Figure 1, looking rearwardly.

Figure 3 is a fragmentary section, on an enlarged scale, taken in the plane indicated by the line 3—3 of Figure 2.

Figure 4 is an enlarged detail section showing one of the brakes comprised in my improvement.

Similar numerals of reference designate corresponding parts in all of the views of the drawings.

In general the motor truck 1 is of conventional construction or of any other construction compatible with the purposes of my invention, and its dump body 2 is hingedly mounted on the frame or chassis 3 at the point 4, and is provided on its forward end wall with an anti-friction roller 5, the said roller 5 being designed for the passage thereover of the cable 6 when it is desired to use the cable 6 and the draft means connected therewith for the drawing of a heavy load to a point adjacent to the body 2. As shown the cable 6 is connected at one end 7 to the forward end of the body 2 and is passed over a sheave 8 on a fixed upright 9 so that power means hereinafter described in detail may be utilized for the raising of the forward end of the body 2 and the putting of the said body 2 into dumping position. Of course, when the cable 6 is to be used for the purpose first ascribed to it the said cable 6 is disconnected from the body 2 at 7, and is removed from the sheave 8 and is trained over the anti-friction roller 5 and carried rearwardly through the rear end of the body 2 which will be open or else will be provided with a removable tail gate. The opposite end of the cable 6 is connected to and adapted to be wound upon a drum 10 disposed longitudinally of the motor truck. The said drum 10 is mounted in appropriate bearings on the truck frame, and is fixed with respect to a worm gear 11 which is meshed with a worm 12 on a transverse shaft 13. The said worm 12 is loose on the shaft 13, and has one of its ends 14 shaped to form a clutch member, and splined or feathered and endwise movable on the shaft 13 is a complementary clutch member 15. This latter is provided with a circumferentially grooved portion 16 for the engagement of a fork or arm 17 on a transversely movable rod 18, the said rod 18 being connected at 19 to the rear arm of a horizontally swinging lever 20, Figure 1, the forward arm of the said lever 20 being connected with the lower arm of an upright, transversely swingable cam lever 21. Thus by manipulating the lever 21 an attendant is enabled to shift the clutch member 15 so as to put the drum 10 in operation or render said drum 10 idle, as occasion demands.

At 30 is the driven shaft of the internal combustion engine of the motor truck 1, and at 31 is a shaft disposed longitudinally of the motor truck and connected with the shaft 30 through the medium of the sprocket gears and belt illustrated or any other appropriate driving connection.

Journaled in appropriate bearings 40 on the truck 1 is an upright rock shaft 41 which is provided with an appropriately truffed lateral arm 42 and is adapted to be used as a crane. The said crane 42 is swingable in a horizontal plane and is equipped at its outer end with a sheave 43 over which is trained a cable 44, the said cable 44 being connected at one end 45 to the crane and having a pulley block 46 in its bight, and being trained not only over the sheave 43 but also over a sheave 47 above the post or rock shaft 41, and after being passed over the said shaft 47 the said cable 44 is carried downwardly and is connected to and adapted to be taken up on and let off a drum 48, said drum 48 being disposed at right angles to the before mentioned drum 10. Fixed with respect to the drum 48 is a spur gear 49, and meshed with said spur gear 49 is a spur gear 50 that is loose on the shaft 13 and has its inner end shaped to form a clutch member 51. The said clutch member 51 is opposed to the correspondingly shaped end of the before mentioned clutch member 15, and consequently it will be understood that when the member 15 is shifted through the medium of the means before described into engagement with the clutch member of the gear 50, the gear 49 and the drum 48 will be rotated. The shaft 13 is provided at 60 with a miter gear best shown in Figure 3. Extending at right angles to the shaft 13 is a shaft 61, and fixed on said shaft 61 is a sprocket gear 62, connected through a sprocket belt 63 with a sprocket gear 64 on a shaft 65, the said shaft 65 having fixed thereto a worm 66 that is meshed with a worm gear 67 fixed to and surrounding the before mentioned crane shaft or rock shaft 41. Thus when the shaft 65 is rotated, the upright shaft or post 41 will be rocked about its axis for the swinging of the overhanging arm 42 which is manifestly well adapted to facilitate the transfer of a heavy load to and from the body 2. In this connection it will be noted that in Figure 1 the overhanging arm of the crane is located longitudinally of the props and above the body 2, and in Figure 2 the said arm of the crane is positioned at right angles to the props or in laterally extending position relative thereto.

Fixed to the rear end of the shaft 31 is a miter gear 70, and loose on the shaft 61 are miter gears 71 meshed with the said gear 70. The said gears 71 are provided with clutch members 72 which are arranged at opposite sides of a slidable clutch member 73, the latter being splined on the shaft 61 and being provided with ends complementary to the clutch members 72. The clutch member 73 is also provided with a circumferentially grooved portion 74 for the engagement of a yoke 75 in connection with a rod 76 extending from a hand lever 77 through the medium of which the clutch member 73 may be shifted according to the direction of which it is desired to turn the upright shaft or post 41 of the crane. Manifestly when the clutch member 73 is in neutral position, the intermeshed worm 66 and worm gear 67 will strongly hold the post 41 and the crane against swinging movement.

Shafts 13 and 13ˣ are connected together through the medium of intermeshed miter gears as clearly shown in Figure 1, the miter gear on the shaft 13 being designated by 80, and the miter gear on the shaft 31 being designated by 81.

The shafts 13 and 13ˣ are equipped with appropriate manually controlled brakes 90, Figure 2, each of the said brakes being made up of a pulley 91 fixed to the shaft, a band surrounding the said pulley, a rod 92 for contracting the said band and braking the shaft, and a spring 93 for expanding the band when it is desired to release the shaft.

It will be apparent from the foregoing that my improvement is adapted to materially facilitate the transfer of freight to and from the body 2 of the truck, and that the mechanism comprised in the improvement is simple and compact and is susceptible of being easily controlled by the truck driver.

While I prefer the construction and relative arrangement of the elements disclosed in the present and preferred embodiment of my invention I do not desire to be understood as confining myself to the precise construction and relative arrangement of parts inasmuch as in the future practice of my invention modifications in the structure and in arrangement may be made within the scope of my appended claim.

Having described my invention, what I claim and desire to secure by Letters-Patent, is:—

A power transmission means for operating a crane and hoisting mechanism and a vehicle dumping mechanism from an engine including, in combination, a drive shaft driven by the engine and having a gear at its end, a driven shaft formed transversely to the drive shaft and having a gear meshed with the first gear, a worm loose on said drive shaft, said worm having an end portion constituting the clutch member, a clutch member splined on said shaft, a third shaft alined with the second shaft and having a gear on its outer portion and another gear on its inner portion and also having a clutch member in opposed relation to said splined clutch member, a hoisting drum having a gear meshed with the third mentioned gear, and upright shaft for maneuvering a crane, a worm gear fixed to said upright shaft, a worm meshing with said worm gear, a reversible driving connection manually controlled and interposed between the third shaft and the last mentioned worm, a dumping drum having a worm gear meshed with said first mentioned worm, and means for shifting the splined clutch member into engagement with the clutch member on the first mentioned worm for operating the dumping drum or for engaging the splined clutch member with the clutch member on the third shaft for operating the hoisting drum and the reversible driving connection so that the crane may be maneuvered.

In testimony whereof I affix my signature.

JAMES B. McDEVITT.